COMBINATION OF SOLDERLESS TERMINAL ASSEMBLY AND SEMICONDUCTOR

Filed Feb. 6, 1968

WITNESSES
Theodore F. Wrobel
Donald M. Winegar

INVENTORS
Joseph Marino and
William R. Schaefer
BY
C. L. Menzemer
ATTORNEY

United States Patent Office 3,519,895
Patented July 7, 1970

3,519,895
COMBINATION OF SOLDERLESS TERMINAL ASSEMBLY AND SEMICONDUCTOR

Joseph Marino, Irwin, and William R. Schaefer, Greensburg, Pa., assignors to Westinghouse Electric Corporation, Pittsburgh, Pa., a corporation of Pennsylvania Filed Feb. 6, 1968, Ser. No. 703,412
Int. Cl. H01l *1/12, 1/14*
U.S. Cl. 317—234 5 Claims

ABSTRACT OF THE DISCLOSURE

A solderless electrical connector assembly comprises a support member comprising an electrically insulating material. A layer of electrically conductive material is disposed on the top surface of the support member in each of two locations and both are electrically insulated from each other. A separate tubular electrically conductive member is connected to each layer and extends upwardly through the support member to which it is attached, through the electrically conductive layer and terminates at a point above the layer. Electrically conductive protuberances provide electrical connections between the assembly and the element it is mounted on.

BACKGROUND OF THE INVENTION

Field of the invention

This invention relates to solderless electrical connectors for semiconductor devices.

Description of the prior art

Heretofore, the manufacturers of semiconductive devices have employed many ways to attach leads to devices. Although many semiconductor devices employ the point contact principle it has always been desirable to develop a solderless electrical conductor assembly which would be reliable and lower production costs.

SUMMARY OF THE INVENTION

In accordance with the teachings of this invention there is provided a solderless electrical contact assembly comprising a mounting member having at least two major opposed surfaces constituting the bottom and the top surfaces of the member, the member comprising an electrically insulating material; a first layer of electrically conducting material disposed on a first portion of the top surface of the mounting member; a second layer of electrically conducting material disposed on a second portion of the top surface of the mounting member and electrically insulated from said first layer; at least one electrically conductive member electrically connected to said first layer and extending through said first layer and said mounting member; at least one electrically conductive member electrically connected to said first layer and extending through said second layer and said mounting member; a first tubular electrically conductive member extending upwardly from the bottom surface of the mounting surface, through the mounting member, through the first layer and terminating at a point above the surface of the first layer, the tubular member being in electrically contact with the first layer; and a second tubular electrically conductive member extending upwardly from the bottom surface of the mounting member, through the mounting member, through the second layer and terminating at a point above the surface of the second layer, the tubular member being in electrical contact with the second layer.

An object of this invention is to provide a solderless electrical contact assembly embodying the point contact principle for semiconductive devices.

Another object of this invention is to provide a low cost, reliable solderless electrical contact assembly for use in semiconductor devices.

Other objects of this invention will, in part, be obvious and will, in part, appear hereinafter.

DRAWINGS

In order to more fully understand the invention, reference should be had to the following drawings in which.

DESCRIPTION OF THE INVENTION

Figure 2:
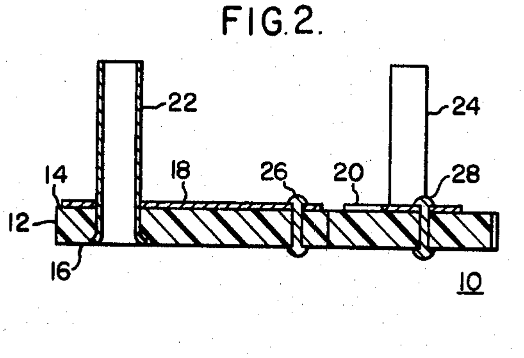
FIG. 2 is an elevation view, partly in cross section, of the assembly of FIG. 1 taken along the line II—II.
Figure 1:
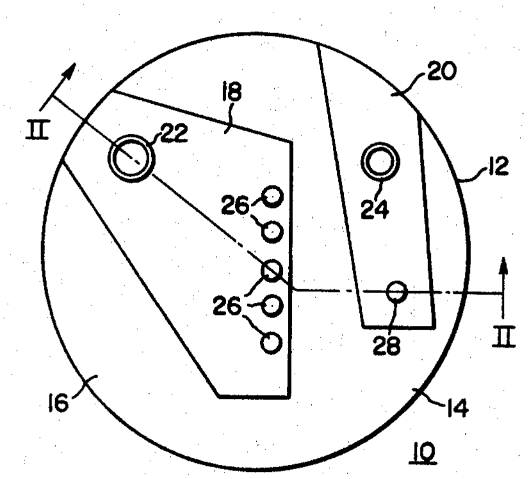
FIG. 1 is a planar view of a solderless electrical contact assembly embodying the teachings of this invention.

With reference to FIGS. 1 and 2, there is shown a solderless electrical contact assembly 10 made in accordance with the teachings of this invention. The assembly 10 comprises a mounting member 12 which is preferably made of an electrically insulating material. The member 12 may be of any geometric shape and has two substantially flat opposed surfaces which constitute a top surface 14 and a bottom surface 16.

Two layers 18 and 20 of electrically conductive material are disposed on the top surface 14 of the member 12. The layers 18 and 20 are not electrically connected to each other.

A suitable means for providing both the member 12 and the electrically conductive layers 18 and 20 is to employ printed circuit materials, particularly copper clad electrically insulated materials. The layers 18 and 20 are formed by any of the well known techniques known to those skilled in the art such, for example, as the photolithographic technique. The thickness of the printed circuit material should be such as to allow the member to have some flexibility and to be able to resist the application of a constantly applied resilient force loading. Printed circuit materials having an insulating mounting member 12 of approximately 1/16 of an inch in thickness have been found to have sufficient strength for use in the contact assembly 10.

A first tubular member 22 comprising an electrically conductive material, such, for example, as copper, extends vertically upward through the member 12 and the layer 18 from the bottom surface 16 of the member 12 to a point above the layer 18. The member 22 is electrically connected to the layer 18. In the same manner a second tubular member 24 is electrically connected to the layer 20 and extends vertically upward from the bottom surface 16 of the member 12 to a point above the layer 20. Preferably, the members 22 and 24 are tubular rivets whose bases are countersunk into the member 12 so as to be located at least flush with the surface 16.

A plurality of electrically conductive members 26 are each connected to the layer 18 of electrically conductive material 18 and extends through the layer 18, through the member 12, and terminate preferably in the shape of button shaped electrical contacts protruding below the bottom surface 16 of the member 12. It has been found that a soft copper rivet is suitable for forming each of the members 26. In a similar manner at least one electrically conductive member 28, comprises the same or similar material as the mmeber 26, is electrically connected to the layer 20 and extends through the layer 20, through the member 12 and terminates in a raised electrical contact head.

Figure 3:
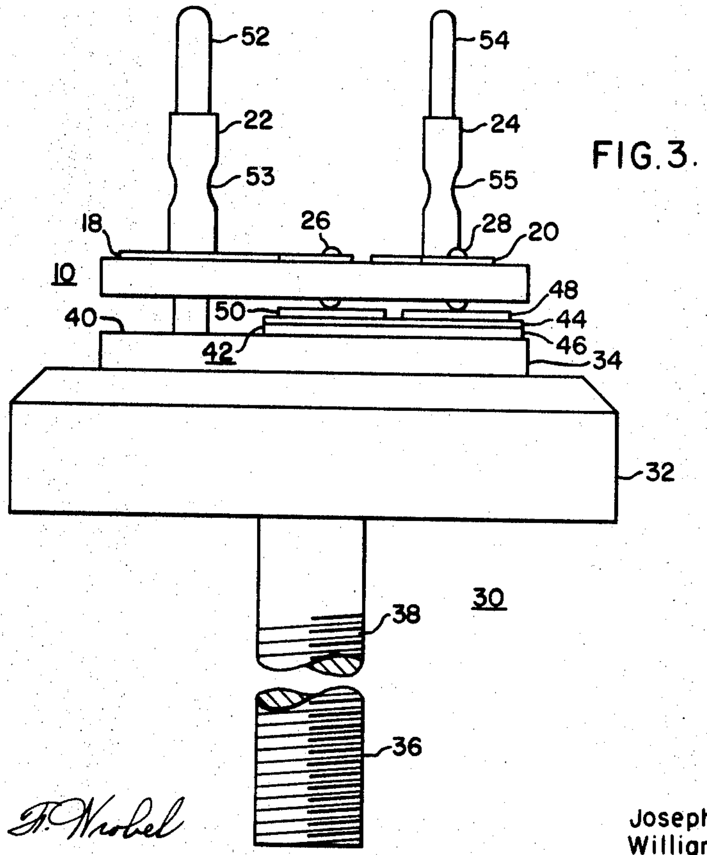
FIG. 3 is an elevation view of an electrical device utilizing the assembly of FIG. 1.

Referring now to FIG. 3, there is shown a semiconductor device 30 embodying the solderless electrical contact assembly 10 of this invention.

The device 30 comprises a thermally and electrically conductive support member 32 having a pedestal portion 34. An electrical contact and thermal dissipating stud 36 is either affixed to, or is integral with, the support member 32. The stud 36 is used to connect the support member 32 to an electrical conductor and heat sink. At least a portion of the stud 36 has threads 38.

The pedestal portion 34 has a substantially flat mounting surface 40 upon which is disposed a semiconductor assembly 42. The semiconductor assembly 42 comprises a semiconductor element 44 having at least one p-n junction contained therein and a back-up electrode 46 to which the element 44 is affixed. As shown in FIG. 3, the element 44 has two regions of opposite type semiconductivity formed in its upper surface. Layers 48 and 50 of electrically conductive metal are each affixed to one of the separate regions of semiconductivity.

Two electrically conductive members 52 and 54 are each affixed to the support member 32. Each of the members 52 and 54 is electrically insulated from the member 32.

The solderless electrical contact assembly 10 is assembled into the device 30 with the conductive layers 18 and 20 of the assembly 10 top side up. The assembly 10 is properly aligned by inserting the members 52 and 54 in the respective tubular members 22 and 24 and sliding the assembly 10 downward until it rests on the element 44. Sufficient pressure is applied to the assembly 10 to rest it properly without damaging the element 44 while the tubular members 22 and 24 are each deformed by suitable means such, for example, as by mechanical crimping in respective areas 52 and 54. The deformed areas 52 and 54 are of sufficient size and depth to assure good electrical conductive relationships between respective members 22 and 52 and 24 and 54. The deformed areas 52 and 54 also retain the electrically conductive members 26 and 28 in a good electrically conductive relationship with the respective layers 50 and 48 of the element 44 until the device 30 is encapsulated.

Preferably, the device is encapsulated by either of two suitable encapsulation methods. One method comprises the employment of resilient force means comprising D-shaped metal washers, D-shaped electrical insulation material and D-shaped spring washers. The other method is to encapsulate the solderless electrical connection assembly 10 in place on the semiconductor assembly 42 within an epoxy-like material. The top portion of each of the members 52 and 54 protrudes above the encapsulation material to enable one to contact the regions of the element 44 beneath the conductive layers 50 and 48. In either method employed, the conductive members 26 and 28 are in a pressure contact relationship with the respective layers 50 and 48.

Figure 4:
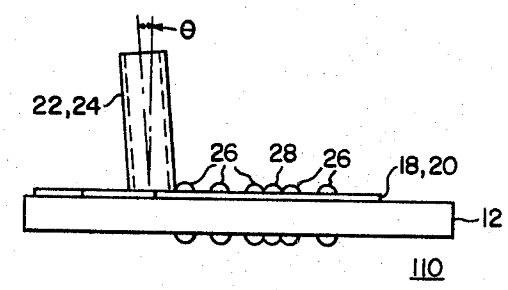
FIG. 4 is an elevation view of an alternate design of the assembly of FIG. 1.

Referring now to FIG. 4, there is shown a solderless electrical connector assembly 110. The assembly 110 is an alternate form of the assembly 10. All materials comprising the assembly 110 are the same as those comprising the assembly 10. The difference between the two assemblies 10 and 110 is that the tubular members 22 and 24 of the assembly 110 are slightly inclined from the vertical as indicated by the angle $\theta$. By the inclination of the members 22 and 24 in a direction away from the opposite end of the member 12, the opposite end is forced downward when the assembly 110 is assembled into the device 30. The members 22 and 24 of the assembly 110 are only slightly inclined to prevent damage to either the member 12 or the semiconductor assembly 42 during the application of force to the assembly 110 when the tubular members 22 and 24 are deformed into electrical contact with the perpendicular electrical members 52 and 54 of the device 30. The employment of the assembly 110 is to assure one of a good pressure electrical contact being formed between the conductive members 26 and 28 and the respective conductive layers 50 and 48 of the semiconductor assembly 42.

While the invention has been described with reference to particular embodiments and examples, it will be understood, of course, that modifications, substitutions and the like may be made therein without departing from its scope.

We claim:

1. An electrical device comprising:

a semiconductor element having at least two regions of opposite type semiconductivity, a p-n junction formed at the interface of said regions, and an electrically conductive layer of material disposed on, and in electrical contact with at least one of said regions;

a solderless electrical contact assembly disposed on, and in pressure electrical contact with, said semiconductor element, said solderless electrical contact assembly comprising:

- a mounting member having at least two major opposed surfaces constituting the bottom and the top surface of the member, said member comprising an electrically insulating material;
- a first layer of electrically conducting material disposed on a first portion of the top surface of the mounting member;
- a second layer of electrically conducting material disposed on a second portion of the top surface and electrically separated from said first layer;
- at least one electrically conductive member electrically connected to said first layer and extending through said first layer and said mounting member;
- at least one electrically conductive member electrically connected to said second layer and extending through said second layer and said mounting member;
- a first tubular electrically conductive member extending upwardly from the bottom surface of said mounting member, through the mounting member, through the first layer and terminating at a point above the surface of said first layer, said tubular member being in electrical contact with said first layer; and
- a second tubular electrically conductive member extending upwardly from the bottom surface of said mounting member, through the mounting member, through the second layer and terminating at a point above the surface of said second layer, said tubular member being in electrical contact with said second layer; and means for urging said solderless electrical contact assembly into a pressure electrical contact relationship with said semiconductor element.

2. The electrical device of claim 1 and including a support member; and two electrically conductive members mounted upright on a portion of the top surface of said support member;

means for orienting said solderless electrical connector assembly on said semiconductor element;

means for electrically connecting said solderless electrical connector assembly to said upright electrically conductive members; and in which:

- said semiconductor element is disposed on said support member; and
- said solderless electrical connector assembly is oriented on said semiconductor element by inserting each of the upright electrical conductive members through one of the tubular members of the connector assembly.

3. The electrical device of claim 2 in which:

the means of electrical connection between said vertical electrical members and said solderless electrical contact assembly is accomplished by deforming a tubular member of said connector assembly about a vertical electrical member inserted therethrough.

4. The electrical device of claim 3 in which the means for urging said solderless electrical contact assembly into a pressure contact relationship with said semiconductor element is one selected from the group consisting of resilient force means and epoxy-type encapsulation means.

5. The electrical device of claim 4 in which:

said tubular members of said solderless connector assembly are inclined to the top surface of the mounting member of the assembly, the members being inclined away from the center of said mounting member, and said tilted members comprising a portion of the means for urging said solderless electrical contact assembly into a pressure electrical contact relationship with said semiconductor element.

References Cited

UNITED STATES PATENTS

| | | | |
|---|---|---|---|
| 3,294,988 | 12/1966 | Packard | 317—234 X |
| 3,268,309 | 8/1966 | Frank et al. | 317—235 X |
| 3,370,207 | 2/1968 | Fabel et al. | 317—234 |
| 3,406,366 | 10/1968 | Kontrimas et al. | 317—234 X |
| 3,418,543 | 12/1968 | Marino et al. | 317—234 |
| 3,418,544 | 12/1968 | France et al. | 317—234 |

JAMES D. KALLAM, Primary Examiner

U.S. Cl. X.R.

317—101, 235